United States Patent [19]

Geyer et al.

[11] Patent Number: 4,636,364
[45] Date of Patent: Jan. 13, 1987

[54] APPARATUS FOR PRODUCING A STREAM OF AEROSOL

[75] Inventors: Arthur Geyer; Max Kuisl, both of Ulm; Eugen Pfeiffer, Staig; Helmut Roese, Ulm; Werner Klein, Neu Ulm, all of Fed. Rep. of Germany

[73] Assignee: Licentia Patent-Verwaltungs-GmbH, Frankfurt, Fed. Rep. of Germany

[21] Appl. No.: 730,244

[22] Filed: May 3, 1985

[30] Foreign Application Priority Data

May 11, 1984 [DE] Fed. Rep. of Germany ....... 3417438

[51] Int. Cl.$^4$ .............................. B01F 5/02; B05B 7/22
[52] U.S. Cl. .................................... 422/162; 102/334; 222/146.3; 252/305; 422/199; 423/336
[58] Field of Search .................. 252/305; 102/334; 222/3, 146.3; 423/336; 422/151, 162, 199

[56] References Cited

U.S. PATENT DOCUMENTS

| | | | |
|---|---|---|---|
| 1,296,226 | 3/1919 | Stow | 102/334 X |
| 1,358,084 | 11/1920 | Leigh | 252/305 |
| 1,792,929 | 2/1931 | Remey | 252/305 |
| 2,823,979 | 2/1958 | Sears | 422/151 X |
| 3,355,571 | 11/1967 | De Kerivily | 222/146.3 X |
| 3,647,377 | 3/1972 | Hilgers et al. | 422/151 X |
| 4,241,042 | 12/1980 | Matijevic et al. | 252/305 X |

FOREIGN PATENT DOCUMENTS

| | | |
|---|---|---|
| 0026625 | 9/1980 | European Pat. Off. . |
| 2399978 | 8/1978 | France . |
| 2496231 | 12/1981 | France . |

Primary Examiner—Richard D. Lovering
Attorney, Agent, or Firm—Spencer & Frank

[57] ABSTRACT

A method and apparatus for producing a directed aerosol stream from gaseous and/or vapor phase reactants by conveying the reactants to a reaction site, reacting the reactants at the reaction site in a flame free chemical reaction to produce an aerosol composition, and causing the aerosol composition to flow from the reaction site and immediately surrounding the aerosol composition with a moving, essentially aerosol free gas and/or vapor stream to form a directed aerosol stream enveloped in the aerosol free stream, in which the step of conveying includes conducting each reactant through a respective distributor and then through a discharge element having a substantially higher flow resistance than the distributor in a substantially vertical upward direction to the reaction site, and the step of causing is carried out so that the aerosol composition flows in a substantially vertical upward direction.

8 Claims, 3 Drawing Figures

4,636,364

APPARATUS FOR PRODUCING A STREAM OF AEROSOL

BACKGROUND OF THE INVENTION

The present invention relates to a method and an apparatus for producing a stream of aerosol from a gas and/or vapor mixture by a flame-free chemical reaction.

Such a method is disclosed in copending U.S. application Ser. No. 632,291 Kühne et al, filed July 19, 1984 and now U.S. Pat. No. 4,597,983. According to the teaching of that application, gaseous and/or vaporous reactants are fed to an aerosol generator which is composed of concentrically arranged pipes or conduits.

SUMMARY OF THE INVENTION

It is an object of the present invention to further improve this method and to provide an apparatus for implementing the improved method.

The above and other objects are achieved, according to the present invention, by a method and apparatus for producing a directed aerosol stream from gaseous and-/or vapor phase reactants by conveying the reactants to a reaction site, reacting the reactants at the reaction site in a flame free chemical reaction to produce an aerosol composition, and causing the aerosol composition to flow from the reaction site and immediately surrounding the aerosol composition with a moving, essentially aerosol free gas and/or vapor stream to form a directed aerosol stream enveloped in the aerosol free stream, the improvement wherein the conveying operation is carried out by conducting each reactant through a respective distributor and then through a discharge element having a substantially higher flow resistance than the distributor in a substantially vertical upward direction to the reaction site, and the resulting aerosol composition is caused to flow in a substantially vertical upward direction.

One advantage of the present invention is that, due to the essentially vertical arrangement of the aerosol generator, it permits the use of, for example, quartz and of different grain sizes as fillers. In this way it is possible, in an economical manner, to adapt the flow resistance of the discharge elements to various operating parameters, e.g. to the quantity of gas and/or vapor flowing through.

The present invention will now be described in greater detail with reference to one preferred embodiment illustrated in the drawing.

DESCRIPTION OF THE PREFERRED EMBODIMENTS

The invention can be used to carry out the procedure disclosed in copending U.S. application Ser. No. 632,291, now U.S. Pat. No. 4,597,983, Kühne et al, in which a laminar aerosol stream containing silicon dioxide ($SiO_2$) particles is produced from the gaseous and-/or vaporous reactants silicon tetrachloride ($SiCl_4$) and water vapor ($H_2O$). This aerosol stream is laminarly guided within an envelope composed of a particle-free gas and/or vapor stream.

Figures 1, 2:
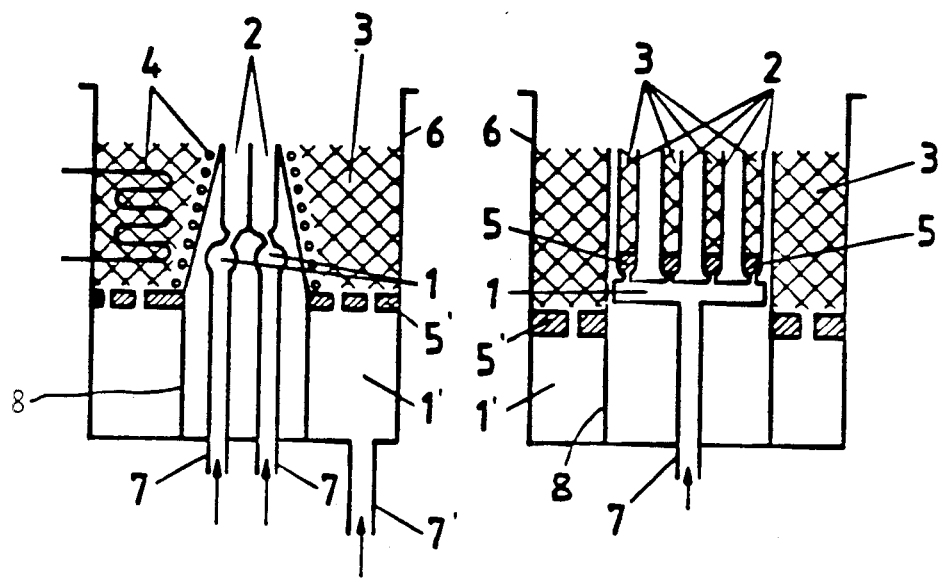
FIG. 1 is a simplified pictorial side cross-sectional view of the preferred embodiment of a generator according to the invention.
FIG. 2 is a view similar to that of FIG. 1, but in a plane perpendicular to that of FIG. 1.
Figure 3:
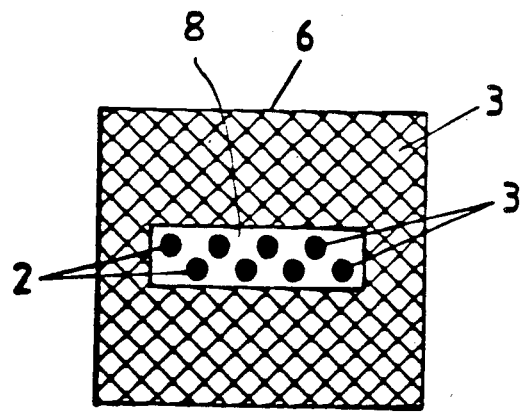
FIG. 3 is a cross-sectional top plane view of the preferred embodiment.

In the generator 6 shown in FIGS. 1 through 3, the exemplarily selected reactants, e.g. silicon tetrachloride and water vapor, are conducted through separate respective feeder conduits 7 into respective distributors, or manifolds, 1, these having, for example, a large cross section and therefore a low flow resistance. Extending essentially perpendicularly from each distributor 1 are a plurality of discharge elements 2, e.g. pipes having a length of about 5 cm and an inner diameter of about 1 cm. To increase flow resistance in discharge elements 2, they are filled with a filler 3, e.g. quartz wool and/or quartz sand, which is prevented from falling into distributor 1 by a gas permeable separating element 5, e.g. quartz wool, nonwoven glass fibers and/or a perforated quartz or ceramic plate. In the described arrangement, the flow resistance of discharge elements 2 is substantially greater, e.g. ten times greater, than that of distributors 1. In this way, it is advantageously accomplished that the quantities of gas and/or vapor exiting each discharge element 2 are almost independent, in particular, of the location of the discharge element along the distributor 1 and/or of pressure fluctuations in time or at specific locations within the distributor 1.

By selecting the grain size and/or fill level of filler 3 in each element 2, the aerosol generator can be set in an economical manner to various operating parameters, e.g. to various gas quantities of the reactants $SiCl_4$ and $H_2O$. Heating of the reactants can be effected by at least one heating device 4, e.g. an electric resistance wire coated with quartz and/or a furnace disposed outside the aerosol generator. In the latter case, filler 3 in elements 2 provides the necessary heat conduction to the reactants.

The alternating arrangement of discharge elements 2 for the two reactants shown particularly in FIG. 3 advantageously permits precise determination of the cross-sectional area of the aerosol stream as well as the degree of mixing of the reactants. In the illustrated embodiment, the resulting aerosol stream has an essentially rectangular cross section.

To establish this cross section, the outlet ends of elements 2 are distributed across a rectangular region delimited by a generally rectangular inner housing 8. Inner housing 8 defines with the outer housing of generator 6 an annular rectangular chamber which is open at the top. The lower part of this chamber constitutes a distributor, or manifold 1' connected to a feeder conduit 7' for supplying a particle-free gas and/or vapor, for example an inert gas such as $N_2$, to distributor 1'.

The upper boundary of distributor 1' is delimited by a gas permeable separating element 5', which can have the same composition as element 5. The region above element 5' is filled to a selected height with filler 3.

A particle-free gas and/or vapor is supplied via conduit 7' at a flow rate sufficient to produce, at the open top of the annular chamber, an enveloping laminar flow stream which prevents radial movement of particles in the aerosol stream.

The quantity and composition of filler 3 in the annular chamber are selected to establish the desired flow resistance.

The present invention is not limited to the illustrated embodiment but can be used for other embodiments in the same sense. For example, it is possible to arrange the discharge elements 2 in such a way that an aerosol stream results which has a circular cross section.

In the embodiment shown in FIGS. 1 to 3 the inner housing 8 has a width of about 2 cm, measured at the top of the generator 6. The length of the inner housing 8 is dependent on the length of the aerosol stream to be generated. For example, the length can be in a range of 20 cm to 1 m. The dimensions of the outer chamber depend on those of the inner housing and are chosen in a way that at the top of the generator 6 the inner housing 8 is surrounded by an area which has a with of about 6 cm and which is filled with filler 3. The constriction of the inner housing to the aforementioned area is necessary because of the relatively large diameter of the distributors 1. In this way a small aerosol stream can be produced.

The reaction gases are introduced by bubbling a carrier gas, e.g. nitrogen, through a bubbler which contains liquid $SiCl_4$ or water and which is held at a constant temperature. Therefore the carrier gas is loaded with gaseous $SiCl_4$ or water vapor according to their vapor pressure. To achieve a high concentration of the reacting components the temperature of the bubbler vessels must be relatively high, e.g. 10° C. below the boiling point. Obviously all conduits to the reacting site and connections 7 must be held at high temperatures comparatively to those of the bubblers to prevent condensation of the reaction gases. As an example the gas volumes for a high concentration reaction are 100 l/h $SiCl_4$ with 45 l/h $N_2$ as carrier gas and
200 l/h $H_2O$ with 90 l/h $N_2$ as carrier gas.

These gas streams generate a stream velocity of about 3 cm/s at the entrance of the reacting site on the top of the generator 6. For diminishing the concentration of reaction gases, a bypass stream of carrier gas could be installed around the bubblers in a way that the velocity of the resulting gas stream is not affected. If the velocity of the particle free gas stream envelope is also adjusted to 3 cm/s a total flow of 4.5 $m^3/h$ of $N_2$ is needed in this example.

It will be understood that the above description of the present invention is susceptible to various modifications, changes and adaptations, and the same are intended to be comprehended within the meaning and range of equivalents of the appended claims.

What is claimed is:

1. In apparatus for producing a directed aerosol stream from gaseous and/or vapor phase reactants, including means for conveying the reactants to a reaction site where the reactants undergo a flame free chemical reaction to produce an aerosol composition, and means for causing the aerosol composition to flow from the reaction site and for immediately surrounding the aerosol composition with a moving, essentially aerosol free gas and/or vapor stream to form a directed aerosol stream enveloped in the aerosol free stream, the improvement wherein said means for conveying comprise: a distributor for receiving at least one of the reactants; at least one discharge element connected to said distributor for conveying the at least one reactant substantially vertically upwardly to said reaction site; and means including a mass of heat resistant filler material in said element for giving said element a flow resistance which is higher than that of said distributor.

2. Apparatus as defined in claim 1 wherein there is a said distributor for each reactant and at least one said discharge element is connected to each said distributor and extends upwardly from its associated distributor, and said filler comprises $SiO_2$-containing particles sufficient to give said element a select flow resistance.

3. Apparatus as defined in claim 1 wherein there are at least two reactants, at least two said distributors each for receiving a respective reactant, and at least two discharge elements connected to each said distributor, and wherein each of said discharge elements has an outlet end and all of said discharge elements are positioned such that said outlet ends of said discharge elements connected to one said distributor alternate with said outlet ends of said discharge elements connected to the other said distributor, and all of said outlet ends are distributed over an area of selected form.

4. Apparatus as defined in claim 1 further comprising heating means in said mass of filler material for heating at least one of the reactants.

5. Apparatus as defined in claim 1 further comprising separating means located between said distributor and said mass of filter material, said separating means being permeable to the at least one reactant and impermeable to said filler material.

6. Apparatus as defined in claim 5 further comprising a supporting structure in said distributor for supporting said separating means.

7. Apparatus as defined in claim 5, further comprising a second mass of filler material located in said distributor for supporting said separating means, said second mass having a substantially lower flow resistance than said means including a mass of heat resistant filler material.

8. Apparatus as defined in claim 1 wherein said filler material comprises at least one of quartz wool and nonwoven glass fibers.

* * * * *